(12) United States Patent
Heintz et al.

(10) Patent No.: US 8,149,507 B2
(45) Date of Patent: Apr. 3, 2012

(54) BINOCULAR

(75) Inventors: Christof Heintz, Oberursel (DE); Volker Tautz, Wetzlar (DE); Norbert Mueller, Asslar (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 189 days.

(21) Appl. No.: 12/318,803

(22) Filed: Jan. 8, 2009

(65) Prior Publication Data
US 2009/0174939 A1 Jul. 9, 2009

(30) Foreign Application Priority Data

Jan. 8, 2008 (DE) .......... 10 2008 003 414

(51) Int. Cl.
*G02B 23/00* (2006.01)
*G02B 5/04* (2006.01)
(52) U.S. Cl. ......... 359/407; 359/399; 359/431; 359/831
(58) Field of Classification Search .......... 359/407–422, 359/363, 480–482, 431, 831–837
See application file for complete search history.

(56) References Cited

U.S. PATENT DOCUMENTS

| | | | |
|---|---|---|---|
| 3,484,149 A * | 12/1969 | Becker et al. ................. | 359/414 |
| 3,825,328 A * | 7/1974 | Hoch ............................ | 352/60 |
| 4,235,506 A | 11/1980 | Saito et al. | |
| 4,969,724 A | 11/1990 | Ellis | |
| 6,236,504 B1 | 5/2001 | Kao et al. | |
| 6,292,314 B1 | 9/2001 | Perger | |
| 7,271,954 B2 * | 9/2007 | Perger et al. .................. | 359/407 |
| 2003/0002149 A1 | 1/2003 | Watanabe | |
| 2007/0097499 A1 | 5/2007 | Liao | |

FOREIGN PATENT DOCUMENTS

| | | | |
|---|---|---|---|
| DE | 518143 | | 2/1931 |
| DE | 800 438 | | 11/1950 |
| DE | 944 223 | | 6/1956 |
| DE | 193 62 49 U | | 4/1966 |
| DE | 3317350 C1 | | 10/1984 |
| DE | 285 646 | | 12/1990 |
| DE | 288 468 | | 3/1991 |
| GB | 1148639 | | 4/1969 |
| WO | WO 88/02125 | * | 9/1987 |

* cited by examiner

*Primary Examiner* — Thong Nguyen
(74) *Attorney, Agent, or Firm* — Walter Ottesen (57) ABSTRACT

Binoculars have two tubes connected to each other via a folding bridge and an Abbe-König prism system is arranged in each tube and the Abbe-König prism systems are provided for image reversal of respective visual viewing beam paths. Each Abbe-König system includes an isosceles prism and a roof prism adjacent thereto. A laser transmitter (21) in the first tube (3*a*) and a corresponding laser receiver (22) in the second tube (3*b*) can be changed in parallel with respect to the distance to each other by means of the folding bridge (37). One of the two prisms (9, 10) of each Abbe-König prism system (6) is configured with a splitter layer (12, 12', 12") or is connected via a cement layer for splitting the viewing beam (7) and laser beam (24) into separate beams with the beams (7, 24) running part way in common in the respective tubes (3*a*, 3*b*).

20 Claims, 7 Drawing Sheets

BINOCULAR

CROSS REFERENCE TO RELATED APPLICATION

This application claims priority of German patent application no. 10 2008 003 414.2, filed Jan. 8, 2008, the entire content of which is incorporated herein by reference.

FIELD OF THE INVENTION

The invention relates to a binocular having two viewing beams and a folding bridge. Each viewing beam is arranged in an assigned tube and each tube includes an Abbe-König prism system for image inversion of the corresponding viewing beam. Each Abbe-König prism system includes an isosceles prism and a roof prism.

BACKGROUND OF THE INVENTION

The use of Porro prisms of the 2nd type is known for binoculars from German patent publications 285,646; 288, 468; and, 800,438. German patent publication 944,223 B discloses a Porro-like prism. U.S. Pat. No. 6,292,314 discloses the use of an Uppendahl prism.

In various optical systems, especially binoculars, the use of an Abbe-König prism system is known as, for example, in Zeiss Victory binocular 8×40 B T*.

An Abbe-König prism system is a reflection prism system via which an image is erected. A vertical reversal as well as a lateral reversal takes place. This prism system comprises two prisms which are cemented to each other or are arranged one behind the other at a small distance. An axis offset can be effected by the two prisms. The optical axis of the entry ray when entering into the Abbe-König prism system lies parallel to the optical axis of the exit beam from the Abbe-König prism system. When used in binoculars, the magnitude of the offset is typically 4 to 9 mm. The magnitude can be optimized in the optic design to a desired value, for example, between 0 and 10 mm.

Up to now, a light beam, especially a laser light beam has not been coupled in or coupled out because of the tight structural space of a modern slim binocular having Abbe-König prism systems and a folding bridge.

SUMMARY OF THE INVENTION

It is an object of the invention to provide a compact integration of a laser distance measuring device into a binocular having a folding bridge while utilizing Abbe-König prism systems.

The binocular of the invention includes: first and second tubes conjointly defining a distance therebetween; first and second Abbe-König prism systems arranged in the first and second tubes, respectively, for image inverting a viewing beam in the tube corresponding thereto; each of the Abbe-König prism systems including an isosceles prism and a roof prism disposed next to the isosceles prism; a laser transmitter defining a laser beam outgoing therefrom and being disposed in the first tube; a laser receiver being disposed in the second tube; the laser receiver being assigned to the laser transmitter with the laser beam being an incoming laser beam to the laser receiver; a folding bridge connecting the first and second tubes so as to permit varying the distance between the laser transmitter and the laser receiver parallel to each other; one of the isosceles prism and the roof prism of each of the Abbe-König prism systems defining a splitter arrangement for splitting the viewing beam and the laser beam, which run part way in common in the corresponding tube, into separate beams.

This binocular includes Abbe-König prism systems for image inversion of the viewing beams. Each Abbe-König prism system comprises an isosceles prism and a roof prism cemented thereto or disposed at a short distance therefrom. The distance can typically be 0 to 5 mm and is preferably 0.5 to 2 mm. A laser transmitter and a laser receiver are provided. The laser transmitter is assigned to the first viewing beam and the laser receiver is assigned to the second viewing beam. One of the two prisms of each Abbe-König prism system is configured with a splitter layer or is connected via a cement layer whereby, in the particular tube, a splitting of the viewing beam and the laser beam takes place.

The folding bridge ensures the possibility that the distance of the optical axes of the oculars are adjustable to the particular interpupillary distance of the user.

Up to now, binoculars having laser distance measuring devices were so mounted in rigid housings that the optical axes of the two viewing beams were arranged at a fixed distance with respect to each other. In this way, the transmitter and receiver of the laser distance measuring device could be stably aligned with respect to each other with little complexity and therefore very cost effectively. The disadvantage here was that additional prisms had to be built in forward of oculars which are separately movable with respect to each other in order to adjust the interpupillary distance. This led to a configuration of the binocular which was difficult to manipulate.

In the binocular of the invention with the folding bridge, this disadvantage is now overcome in that the laser transmitter is mounted in one binocular half and the laser receiver is mounted in the other binocular half. The distance of the two viewing beams for adjusting the interpupillary distance via the folding bridge can be varied. The costs, which are higher because of the necessary tighter tolerances, are thereby balanced out by the convenient manipulability.

In the binocular of the invention, the slim and linear housing shape can be retained and there is the possibility to provide a series of binoculars having an external approximately like shape irrespective of whether a laser distance measuring device is contained therein.

The isosceles prism is characterized in that it has optically effective surfaces as follows: an entry surface, an exit surface and a reflecting surface. The surface, which lies opposite the reflecting surface, is identified as the head surface. This surface can also be configured to be optically effective. An axial beam, which runs on the optical axis from the objective to the isosceles prism, enters perpendicularly through the entry surface into the prism and is reflected at the reflecting surface which effects an elevation inversion of the image and then exits perpendicularly from the exit surface of the isosceles prism. A total internal reflection (TIR) is then present. The reflection surface can also be configured as a splitter surface so that a portion of the beam is reflected and another portion is transmitted.

Because of the adjustment tolerances, it is conceivable that the axis beam does not impinge mathematically exactly perpendicular but only essentially perpendicular, for example with a deviation of ±2°.

Such isosceles prisms are also referred to in the optics industry as Amici prisms.

The roof prism includes the following optically effective surfaces: an entry surface, two roof reflection surfaces, a further reflection surface and an exit surface.

A beam, which runs on the optical axis from the isosceles prism to the roof prism, enters perpendicularly through the roof prism entry surface into the roof prism. The beam then runs in the direction of the roof surfaces and is reflected thereby. A lateral inversion of the image is effected by the reflections at the two roof surfaces. The reflected beam is then incident on the further reflection surface and is reflected thereby to the exit surface. The beam then leaves the roof prism perpendicularly to the exit surface.

The roof prism entry surface and the further reflection surface are physically one and the same prism surface which, depending upon the angle of incidence, one time acts as a passthrough surface and at another time acts as a reflection surface.

A total internal reflection (TIR) takes place within the roof prism at the roof edge surfaces and the further reflection surface.

The beam, which exits from the roof prism, then runs to the ocular via an intermediate image plane.

A beam splitter surface can be configured in the roof prism. After the beam is reflected at the further reflection surface, and depending upon the wavelength range, the beam can pass through the beam splitter surface to the exit surface or it is reflected again at the beam splitter surface and guided to a separate exit surface through which the beam preferably exits essentially perpendicularly. The separate exit surface, the entry surface and the additional reflection surface are physically one and the same prism surface (see above).

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
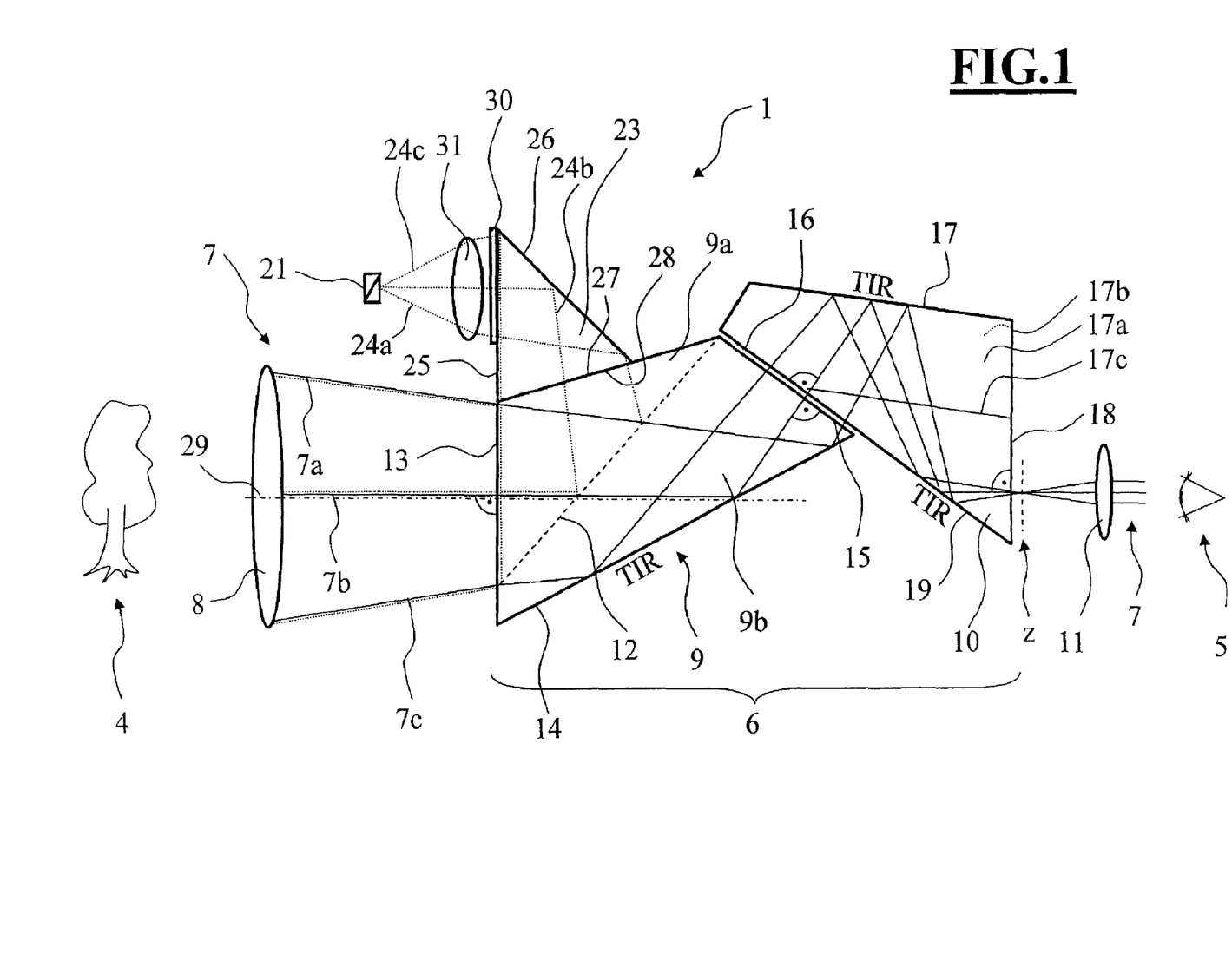
FIG. 1 is a schematic of a binocular half having a splitter layer in the isosceles prism.

FIG. 1 is a schematic of a binocular half 1 having a laser transmitter 21 or a laser receiver 22 of a laser distance measuring device ahead of an object 4. The object 4 is viewed by an observer 5 through the binocular 2 shown in FIG. 6 and the distance of the object can be determined with the laser distance measuring device. The binocular has an Abbe-König prism system 6 in each of the binocular halves.

The tubular housing is omitted in order to provide a better overview in the drawing.

The laser transmitter 21 can be configured as a laser diode and the laser receiver 22 as a photodiode.

The object 4 is shown schematically and is often located at a distance of 3 m to 1500 m during viewing.

A viewing beam 7 runs from an objective 8 through an isosceles prism 9 and a roof prism 10 to the ocular 11 and is shown by solid lines. The roof prism 10 is mounted rearwardly of the isosceles prism 9. The isosceles prism 9 and the roof prism 10 conjointly define the Abbe-König prism system 6. Three rays 7a, 7b and 7c of the viewing beam are shown. The solid line in the interior of the roof prism 10 defines the forward lower roof edge 17c.

The first prism 9 viewed from the light incident from the left comprises two parts 9a and 9b. The two prism parts 9a and 9b are cemented to each other. The common surface of the two prism parts 9a and 9b is configured as a beam splitter. A splitter layer 12 is preferred and applied to one of the two surfaces to be cemented in advance of cementing and this splitter layer is especially a dielectric splitter layer. This splitter layer 12 is shown in FIG. 1 as a broken line.

The splitter layer 12 is so configured that the wavelength range is reflected wherein an infrared laser diode operates including a band of approximately ±50 nm, for example, 850 to 950 nm. A reflection starting at approximately 800 nm is also conceivable. An infrared laser diode can, for example, operate at 905, 1060 or approximately 1500 nm wavelength. The remaining wavelengths, especially the visual range, are passed.

An optical axis 29 of the binocular half is defined by the objective 8 and is shown as a dot-dash line.

After the beam 7 has passed the objective 8, the beam passes through the entry surface 13 into the isosceles prism 9 and the portion of the beam in the visual wavelength range passes through the splitter layer 12. Passing through the splitter layer should take place uninfluenced in such a manner that no or only a minimally perceptible color distortion is generated, for example, ΔRed<3 and ΔGreen<3 according to ISO 14490-5 Annex B Clause B.2. The beam thereafter incidents upon the reflection surface 14 and is reflected thereby via total internal reflection (TIR) to the exit surface 15. The exit surface 15 is cemented to the entry surface 16 of the roof prism 10.

On the other hand, the isosceles prism and the roof prism can be wrung together in optical contact. Alternatively, an air gap can be provided between the exit surface 15 and the entry surface 16. The viewing beam exits from the isosceles prism 9 perpendicularly through the exit surface 15 and enters again at entry surface 16 of the roof prism 10 and is thereafter totally reflected at the roof surface pair 17a and 17b and at the reflection surface 19 in order to reach from there the exit surface 18 and thereafter the ocular 11. The entry surface 16 corresponds to the reflection surface 19.

The roof ridge or roof edge, which is formed by the two roof surfaces, is identified by reference numeral 17. Reference numeral 17c identifies the lower edge of the roof surface 17a. The roof surface 17b as well as the lower edge corresponding thereto is covered by the forward roof surface.

As a rule, an intermediate image plane Z is disposed between the exit surface 18 and the ocular 11.

The surfaces of total internal reflection are identified by TIR in FIG. 1 for the two prisms of the Abbe-König prism system.

In the following the binocular half 1 is described by way of example with the laser transmitter 21. In the second binocular half (not shown) having the laser receiver 22, the laser beam path is the reverse with respect to the travel direction.

In the present embodiment, a deflecting prism 23 is cemented between the laser transmitter 21 and the isosceles prism 9. The deflecting prism 23 functions as a beam folder in order to better utilize the structural space and to permit a slimmer shape of the binoculars. A further advantage is that the laser beam, which is shown by a dot-dash line, is aligned by the deflecting prism 23 parallel to the optical axis 29 which facilitates an adjustment of the laser transmitter.

The laser beam and the optical axis conjointly define an angle of equal to or less than 0.3°.

As shown in FIG. 1, a deflection to the right is realizable as well as a deflection to the left.

The angle of the splitter layer 12 can be so configured that the total laser beam impinges on the reflective surface 26 of the deflecting prism 23.

In the present embodiment, the laser beam of the laser transmitter 21 runs to the deflecting prism 23 and there passes through the passthrough surface 25 thereof and is thereafter reflected at the reflecting surface 26 in order to then leave the deflecting prism 23 through the second passthrough surface 27. The passthrough surface 27 is cemented to the laser passthrough surface 28 of the isosceles prism 9. The laser beam passes through the surface 28 and is reflected at the splitter layer 12 and runs through the passthrough surface 13 and the objective 8 to the object 4. The laser beam 24 is reflected at the object 4. The returning laser beam is directed to the laser receiver 22 in the other tube (not shown) and then the distance of the object 4 can be determined in a manner known per se.

Three component rays 24a, 24b and 24c of the laser beam 24 are shown by broken lines in FIG. 1.

A filter, for example, in the form of a filter layer, can be provided in the region of the passthrough surface 25. Alternatively or supplementarily, such a filter can also be provided in the region of the cement between the isosceles prism 9 and the deflecting prism 23. Unwanted wavelengths can be filtered out by the filter 30.

An ancillary lens 31 can also be provided. The beam path 24 can be shortened by this ancillary lens 31.

Figure 2:
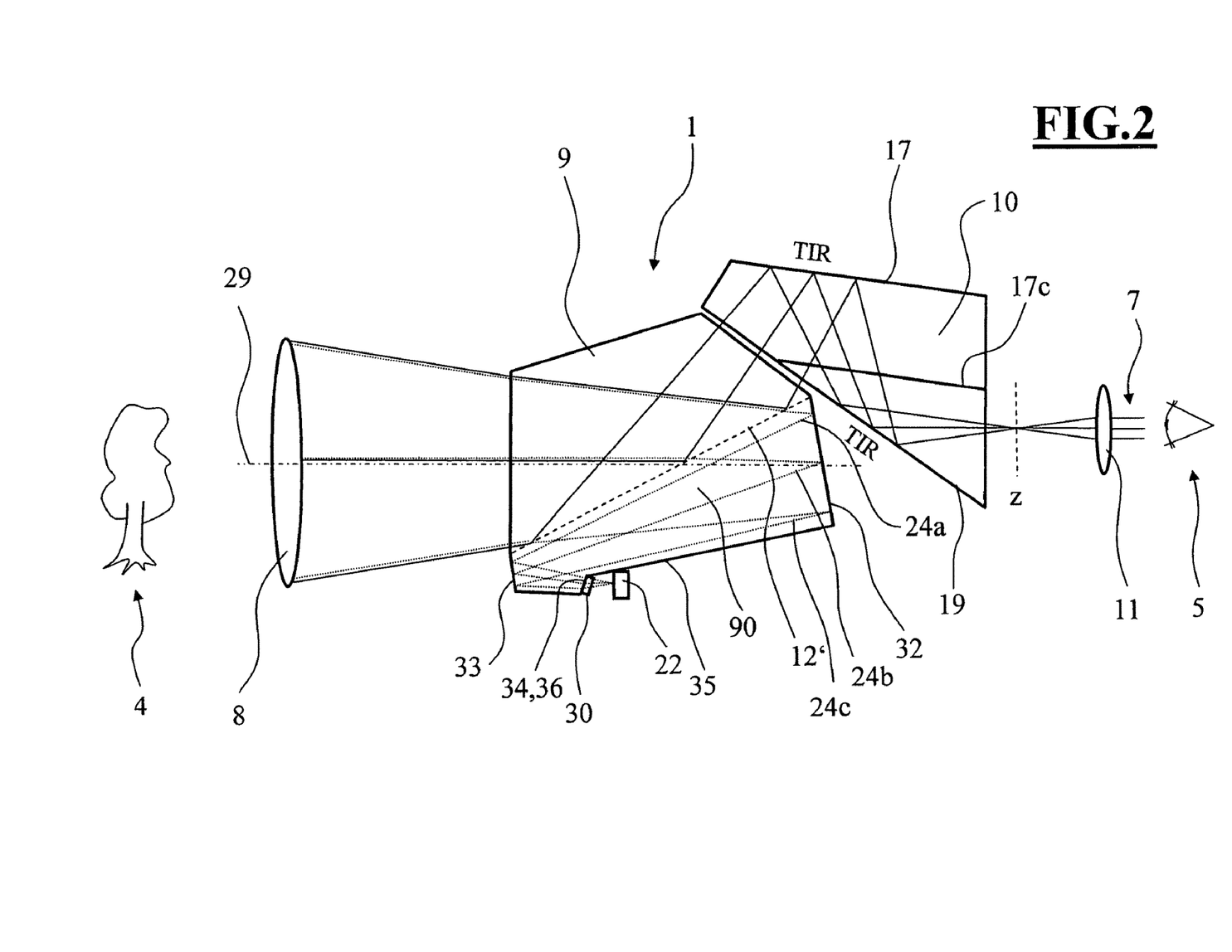
FIG. 2 is a further schematic of a binocular half having a splitter layer in the isosceles prism.

FIG. 2 shows a binocular half. This binocular half can be configured with a laser receiver or with a laser transmitter. In the following, the embodiment is described with a laser receiver and the isosceles prism 9 has a splitter layer 12'.

In FIG. 2, the splitter layer 12' is formed on the lower side of the isosceles prism 9 which functions as a total reflecting surface in the conventional isosceles prism. Here, a deflecting prism 90 is cemented on this surface so that the laser beam 24, which is reflected from the object 4, is passed through and the remaining rays 7, which are reflected by the object 4, are reflected in the isosceles prism 9 at the splitter layer 12'. These rays 7 are especially those rays in the visible range. These reflected rays 7 thereby do not arrive in the reflecting prism 90 and instead reach the observer 5 via the roof prism 10 and the ocular 11.

A dielectric layer can be provided as the splitter layer 12'.

The passed-through laser rays 24 (represented by rays 24a, 24b and 24c) are reflected at a first reflecting surface 32 and a second reflecting surface 33 and so reach the laser receiver 22 via an exit surface 34 and an optional filter 30. The reflecting angles are so selected that the optical axis of the laser receiver 22 runs parallel to the optical axis of the objective whereby the adjustment of the laser receiver 22 is facilitated. It is also conceivable to provide only one reflection surface 32 or more than two reflection surfaces 32 and 33. In this way, a more or less compact structural shape can be achieved.

The laser rays 24 can, for example, have a wavelength of 905 nm±10 nm.

The optional filter 30 can be provided for the purpose of catching unwanted residual light. In this way, the situation is prevented that possibly still remaining components of non-laser light can disturb the measurement notwithstanding the splitter layer.

A very compact beam 24 results by a double reflection in the deflecting prism 90. The exit surface 34 is provided by a shoulder-shaped offset 36 in the base surface 35 lying opposite the splitter layer. This exit surface 34 should have a size of at least 1 mm$^2$.

Figure 3:
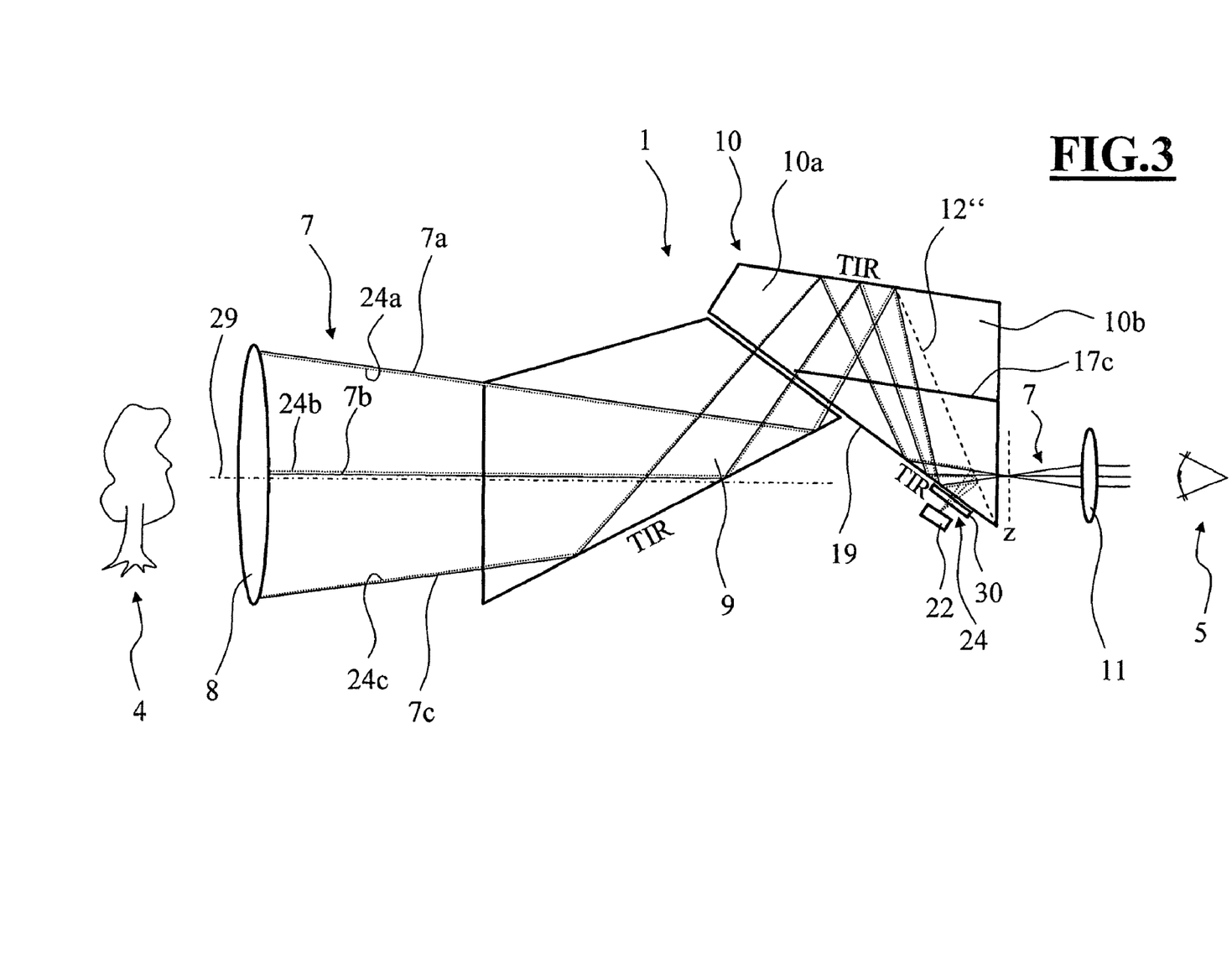
FIG. 3 is a schematic of a binocular half having a splitter layer in the roof prism.

FIG. 3 shows a binocular half. This binocular half can be configured with a laser receiver or with a laser transmitter. In the following, the embodiment with a laser receiver 22 will be described. Here, the roof prism 10 has a splitter layer 12''.

The beam 7, which is reflected from the viewed object 4, as well as the laser beam 24, pass, in common, through the objective 8 and the isosceles prism 9 into the roof prism 10. The beams are totally reflected at the surface 19 because the rays in the region 19 impinge flatter than the boundary angle (e) of the total reflection.

The roof prism 10 comprises two prism parts 10a and 10b cemented to each other. A splitter layer 12'' is arranged at the boundary surface between the two prism parts 10a and 10b. This splitter layer 12'' is so configured that the laser beam 24 is again reflected and the remaining rays 7 are passed. The laser beam 24 then exits through the surface 19. The angle of the exiting laser beam 24 is selected so steep that, this time, no total internal reflection can occur for the laser beam. This means that the surface 19 is used as a transmission and reflection surface. Thereafter, the laser beam passes through an optional filter 30, with which residual disturbing light can be filtered out, and then impinges upon the laser receiver 22.

Figure 4:
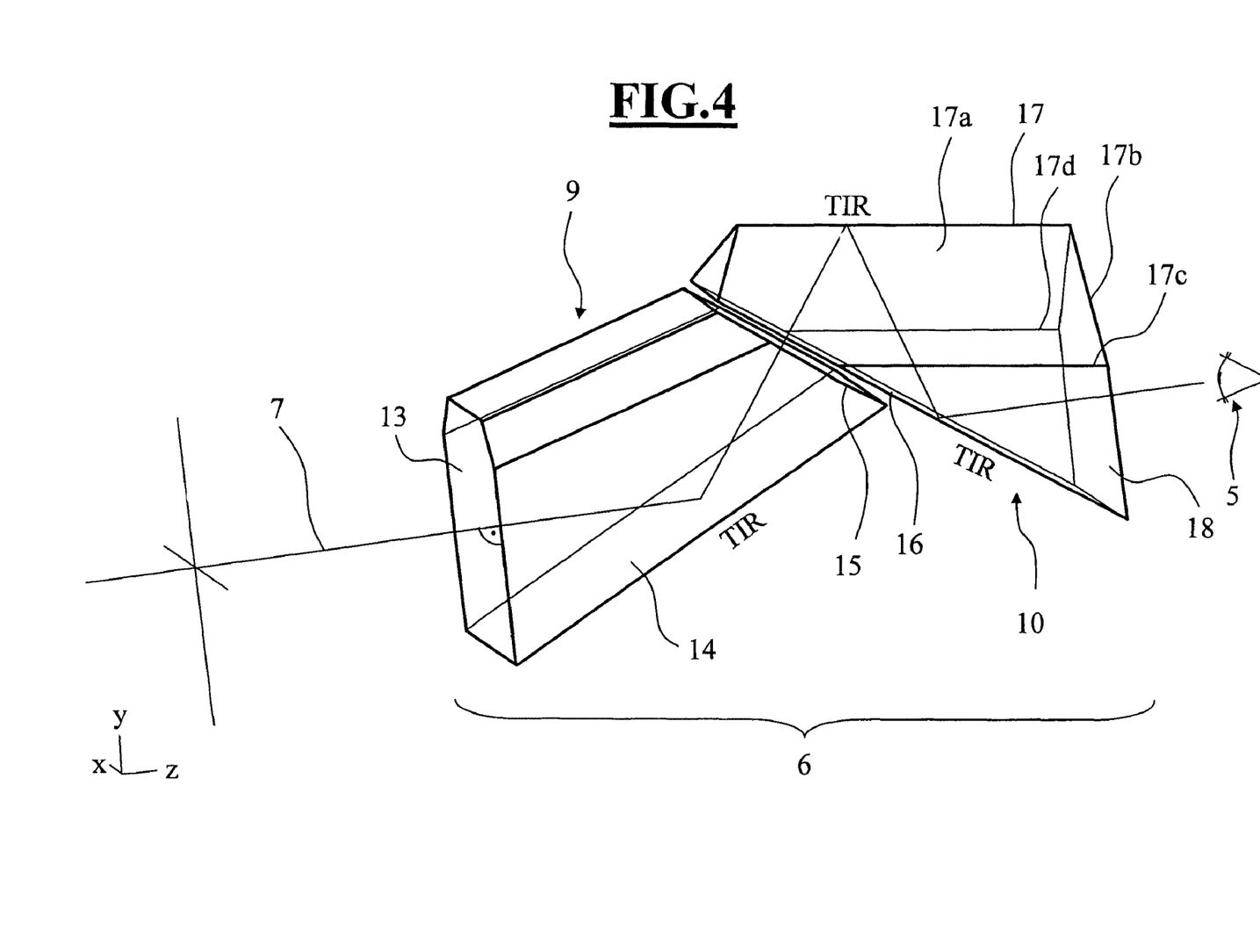
FIG. 4 is a schematic of an Abbe-König prism system.

FIG. 4 shows an Abbe-König prism system 6 comprising an isosceles prism 9 and a roof prism 10. Both prisms are arranged at a narrow spacing with respect to each other. Only a narrow air gap separates the exit surface 15 from the entry surface 16. A light beam 7 enters on the optical axis via the entry surface 13 into the isosceles prism 9 and is there totally reflected at the reflection surface 14 and leaves the isosceles prism 9 via the exit surface 15. The beam 7 then enters into the roof prism 10 via the entry surface 16. The beam 7 is first totally reflected at the roof surfaces 17a and 17b and then at the reflection surface 16 and leaves the roof prism via the exit surface 18.

The surface 16 functions as a transmission surface or as a reflection surface in dependence upon the angle of the impinging beam 7.

Figure 5:
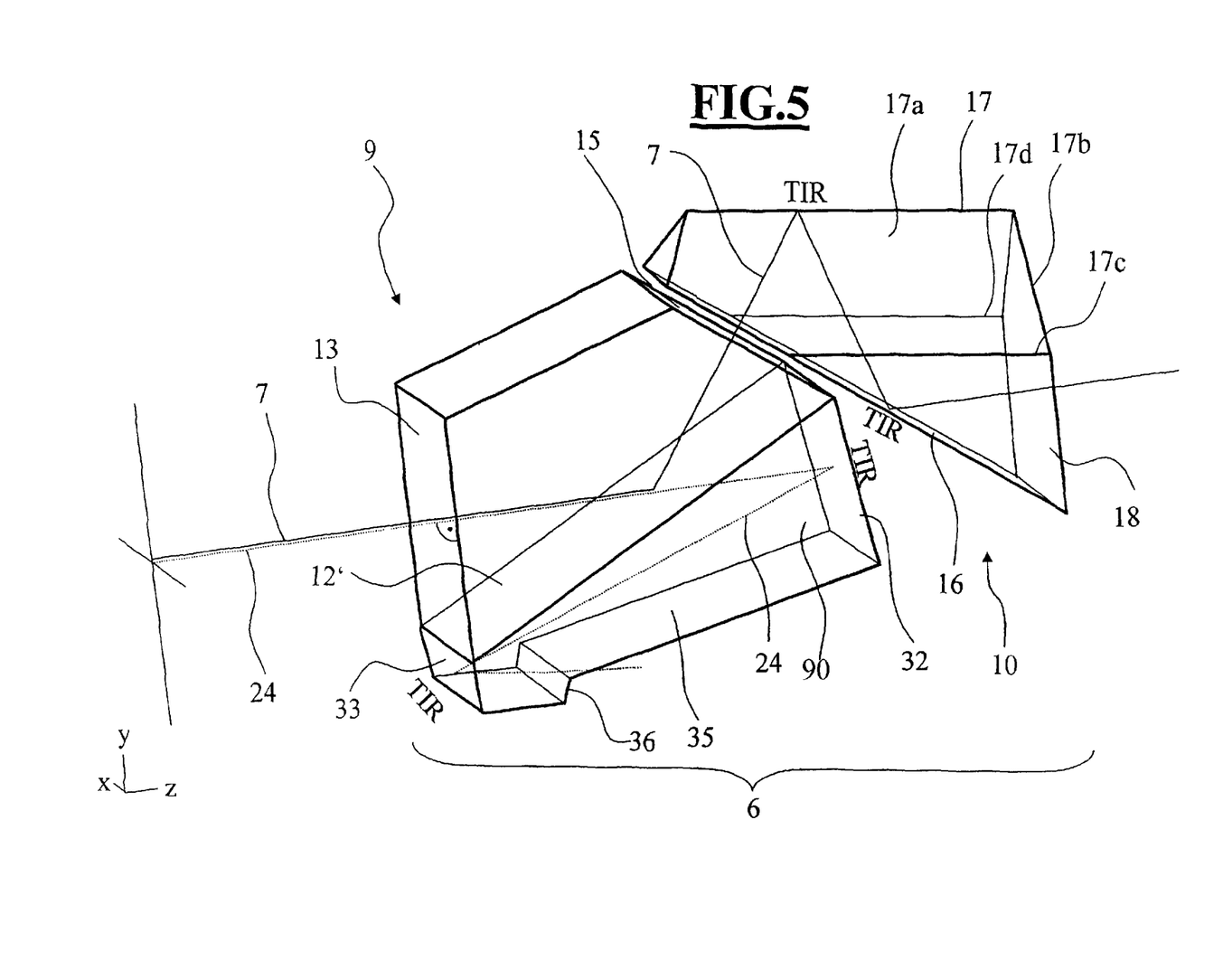
FIG. 5 is a schematic of an Abbe-König prism system according to FIG. 2.

FIG. 5 shows a modified Abbe-König prism system corresponding to the embodiment of FIG. 2. Here, a splitter layer 12' is arranged on the lower side of the isosceles prism 9 and this splitter layer splits the beam into two component beams 7 and 24.

Figure 6:
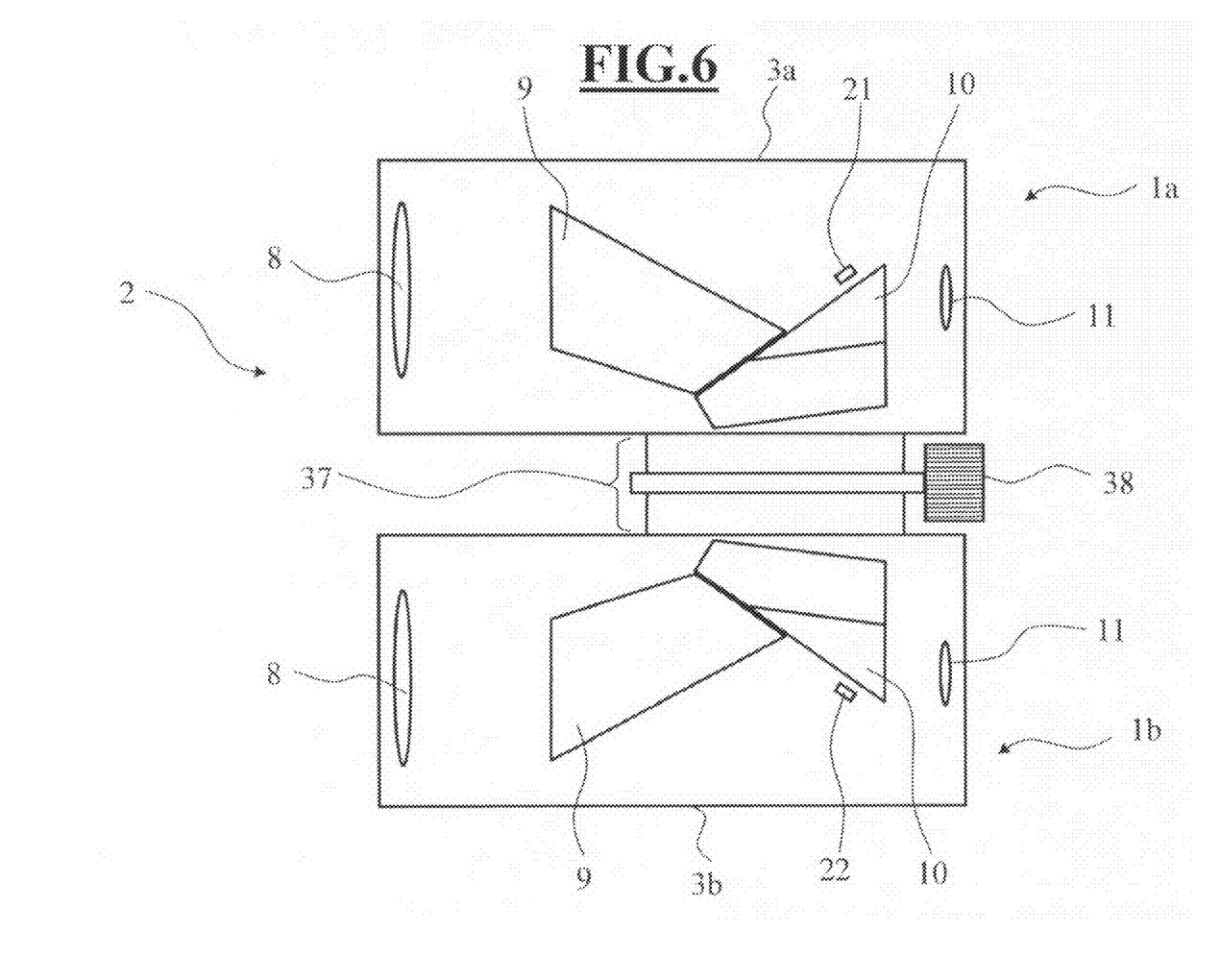
FIG. 6 is a schematic of a binocular according to the invention.

FIG. 6 shows a binocular 2 according to the invention having two binocular halves (1a, 1b) and a folding bridge 37. In the first binocular half 1a, a laser transmitter 21 is arranged and a laser receiver 22 is arranged in the second binocular half 1b. Laser transmitter 21 is arranged within the tube 3a and laser receiver 22 is arranged within tube 3b.

The two binocular halves 1a and 1b are connected by the folding bridge 37. In this way, the distance of the tubes 3a and 3b to each other can be varied.

Figure 7:
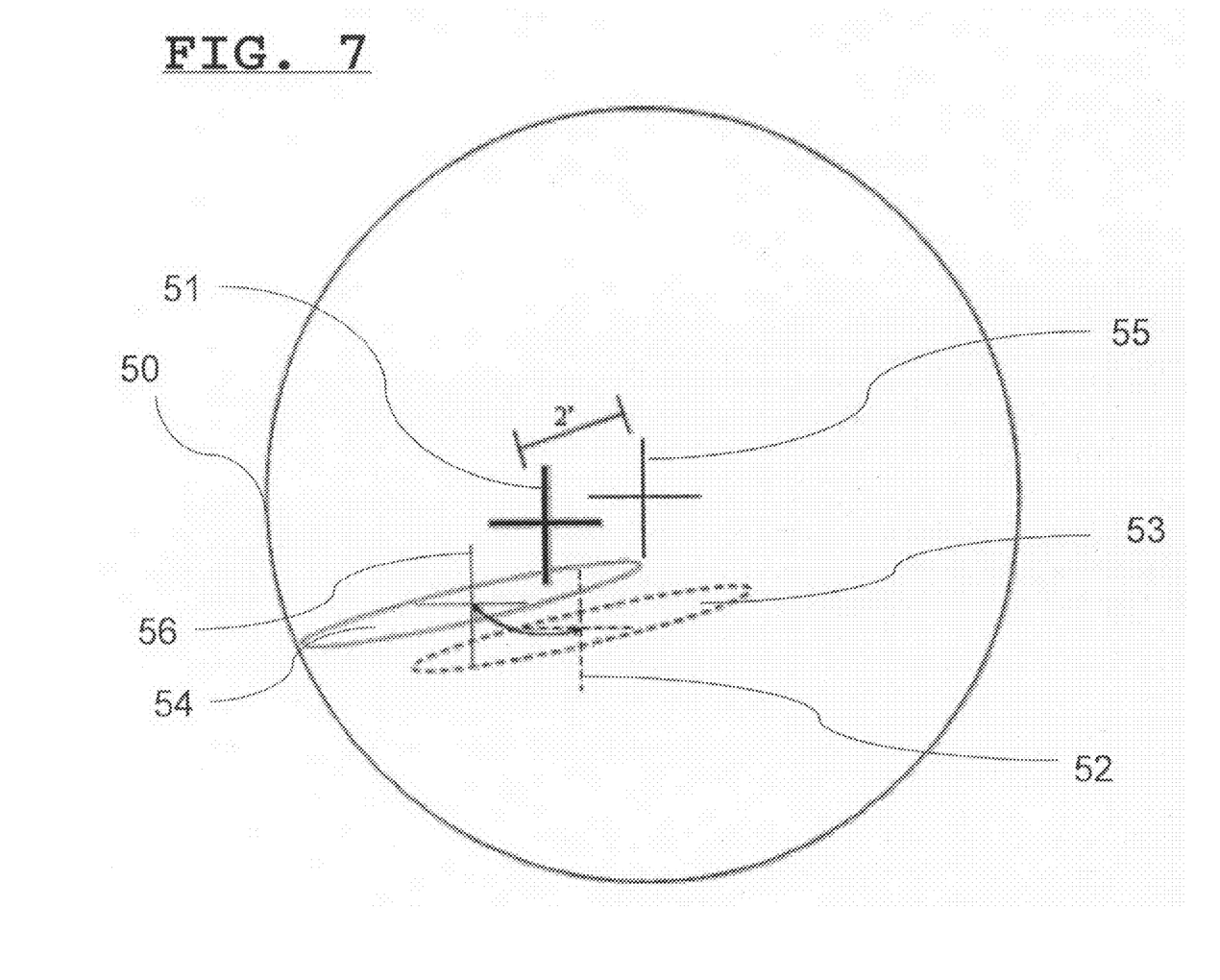
FIG. 7 shows the visual field of the laser receiver on a white wall.

In FIG. 7, the binocular according to the invention is directed onto a white wall shown by the white paper surface. FIG. 7 shows the visual field 50 of the laser receiver 22. The visual field of the laser receiver 22 has, for example, a 12' diameter in angular minutes. All laser light that comes back from this spatial angle impinges on the laser receiver 22. The mechanical center axis of the binoculars is identified by reference numeral 51. Reference numeral 52 identifies the laser beam axis of the laser transmitter 21. Reference numeral 53 identifies the surface of the laser beam which illuminates the white wall. The longitudinal axis can, for example, be 4' to 6'.

If the receiver side (binocular half 1b) and the center axis 51 in the binocular of the invention are held fixed and only the transmitter side (binocular half 1a) is folded, then the laser beam moves relative to the receiver visual field 50. The mechanical center axis 51 and the visual field axis 55 of the laser receiver 22 remain spatially fixed. Reference numerals 54 and 56 identify, for example, the new position of the laser beam.

For example, an adjusting tolerance of the target line (laser beam axis) 52 of ±2' is provided for the mechanical center axis 51. The same applies to the axis of the receiver beam path 55 to the mechanical center axis 51, that is, the two axes (transmitter to receiver) can, in the above example, only stand apart by a maximum of 4'. The receiver axis 55 is the center point of the above-mentioned visual field 50 of 12' diameter (6' radius). Of the 6', a maximum of 4' is therefore used as axis deviation (all axes on one line). The laser spot itself has still a diameter (elongated ellipse, orientation as desired) of 4' to 6'. In an unfavorable case, that is, all crosses lie on the same line and half the diameter of the laser spot, then 2'+2'+3'=7' applies, that is, 1' of the ellipse lies outside of the large circle.

It is also provided that the precision with which the transmitter and receiver axes are adjusted to each other is matched to a region of few arc minutes. In one embodiment, the range is <±10' or <±5', especially <±2'.

It is preferable that, when folding the binocular about its center axis, at least 50% (better 75%, still better >90%) of the laser beam incident spot is seen by the receiver diode within the visual field used.

As a glass type for the prism, BK7 can be used or other suitable materials such as plastics can be used.

To reduce the weight of the prism, facets can be ground in order to remove that part of the prism material which is unimportant for the beam.

Reflection surfaces which do not function as a splitter layer can be mirrored with a dielectric layer or even with some other layer, for example, an aluminum layer or a silver layer. This mirroring concerns, for example, the reflection surfaces 32 and 33.

It is understood that the foregoing description is that of the preferred embodiments of the invention and that various changes and modifications may be made thereto without departing from the spirit and scope of the invention as defined in the appended claims.

REFERENCE NUMERAL LIST

Binocular half 1a, 1b
Binocular 2
Tube 3a, 3b
Object 4
Observer 5
Abbe-König prism system 6
Viewing beam/beam 7
Objective 8
Isosceles prism 9
First prism part 9a
Second prism part 9b
Roof prism 10
First prism part 10a
Second prism part 10b
Ocular 11
Splitter layer 12, 12', 12"
Pass-through surface 13 of the isosceles prism
Reflection surface 14
Exit surface 15
Entry surface 16 of the roof prism
Roof ridge (roof edge) 17
First roof surface 17a
Second roof surface 17b
Lower edges 17c and 17d
Exit Surface 18
Second reflection surface 19
Laser transmitter 21
Laser receiver 22
Deflecting prism 23
Laser beam 24
First passthrough surface 25
Reflection surface 26
Second passthrough surface 27
Laser passthrough surface 28
Optical axis 29
Filter 30
Ancillary lens 31
First reflection surface 32
Second reflection surface 33
Laser passthrough surface 34
Base surface 35
Shoulder 36
Folding bridge 37
Center drive 38
Visual field 50 of the laser receiver 22
Mechanical center axis 51
Laser beam axis 52 of the laser transmitter 21
Surface of the laser beam 53
Surface of the laser beam in new position 54
Visual field axis 55 of the laser receiver 22
Laser beam axis in new position 56
Deflection prism 90
Intermediate image plane Z

What is claimed is:

1. A binocular for viewing an object, the binocular comprising:

first and second tubes conjointly defining a distance therebetween;

first and second Abbe-König prism systems arranged in said first and second tubes, respectively, for image inverting a visual viewing beam in the tube corresponding thereto;

each of said Abbe-König prism systems including an isosceles prism and a roof prism disposed one behind the other;

each of said tubes having a forward lens forward of the Abbe-König prism system and a rearward lens rearward of the Abbe-König prism system;

said forward and rearward lenses of each of said tubes defining an optical axis passing through the corresponding Abbe-König prism system disposed therebetween;

each one of said Abbe-König prism systems being configured to offset the corresponding optical axis passing therethrough in a range from a zero offset to a predetermined offset value;

a laser transmitter defining a laser beam outgoing therefrom to said object and being disposed in said first tube;

a laser receiver being disposed in said second tube;

said laser receiver being assigned to said laser transmitter with said laser beam being reflected at said object to become an incoming laser beam to said laser receiver;

a folding bridge connecting said first and second tubes so as to permit varying said distance between said first and second tubes and therewith varying a spacing between said laser transmitter and said laser receiver parallel to each other;

one of said isosceles prism and said roof prism of each of said Abbe-König prism systems defining a splitter arrangement for splitting the visual viewing beam and the laser beam, which run part way in common in the corresponding tube, into separate beams;

one of said isosceles prism and said roof prism being configured to include a splitter layer defining said splitter arrangement for splitting the visual viewing beam and the laser beam into separate beams;

wherein one of said isosceles prism and said roof prism comprises a first component prism and a second component prism conjointly defining a partition interface whereat said first and second component prisms are connected to each other; and, a coating disposed at said interface to define said splitter layer for splitting said visual viewing beam and said laser beam, which run part way in common in the corresponding tube, into separate beams by reflection of a defined wavelength range.

2. The binocular of claim 1, wherein said laser transmitter is configured as a laser diode and/or said laser receiver is configured as a photodiode.

3. The binocular of claim 1, wherein said coating is a dielectric coating.

4. The binocular of claim 1, wherein said splitter layer is disposed in said isosceles prism or in said roof prism.

5. The binocular of claim 1, wherein the forward lens in each of said tubes is an objective defining the optical axis corresponding thereto; and, each one of said Abbe-König prism systems is configured for said laser beam being close to said optical axis.

6. The binocular of claim 5, wherein said laser beam and said optical axis conjointly define an angle of equal to or less than 0.3°.

7. The binocular of claim 1, wherein said isosceles prism and said roof prism are cemented to each other.

8. The binocular of claim 1, wherein said isosceles prism and said roof prism are wrung together in optical contact.

9. The binocular of claim 1, wherein said isosceles prism and said roof prism are mounted with an air gap therebetween of 0 to 5 mm.

10. The binocular of claim 9, wherein said air gap is 0.5 to 2 mm.

11. The binocular of claim 1, wherein said isosceles prism and said roof prism conjointly define a gap therebetween.

12. The binocular of claim 1, wherein each one of said roof prisms is a cemented prism having a cement layer defining said splitter arrangement for splitting the viewing beam and the laser beam into separate beams.

13. The binocular of claim 1, wherein said offset value lies in a range of 0 to 10 mm.

14. The binocular of claim 1, wherein said offset value lies in a range of 4 to 9 mm.

15. A binocular for viewing an object, the binocular comprising:

first and second tubes conjointly defining a distance therebetween;

first and second Abbe-König prism systems arranged in said first and second tubes, respectively, for image inverting a visual viewing beam in the tube corresponding thereto;

each of said Abbe-König prism systems including an isosceles prism and a roof prism disposed one behind the other;

each of said tubes having a forward lens forward of the Abbe-König prism system and a rearward lens rearward of the Abbe-König prism system;

said forward and rearward lenses of each of said tubes defining an optical axis passing through the corresponding Abbe-König prism system disposed therebetween;

each one of said Abbe-König prism systems being configured to offset the corresponding optical axis passing therethrough in a range from a zero offset to a predetermined offset value;

a laser transmitter defining a laser beam outgoing therefrom to said object and being disposed in said first tube;

a laser receiver being disposed in said second tube;

said laser receiver being assigned to said laser transmitter with said laser beam being reflected at said object to become an incoming laser beam to said laser receiver;

a folding bridge connecting said first and second tubes so as to permit varying said distance between said first and second tubes and therewith varying a spacing between said laser transmitter and said laser receiver parallel to each other;

one of said isosceles prism and said roof prism of each of said Abbe-König prism systems defining a splitter arrangement for splitting the visual viewing beam and the laser beam, which run part way in common in the corresponding tube, into separate beams; and, wherein each one of said roof prisms comprises two prism parts conjointly defining an interface therebetween whereat said two prism parts are cemented to each other; and, said splitter arrangement is disposed at said interface.

16. The binocular of claim 15, wherein said laser beam and said optical axis conjointly define an angle of equal to or less than 0.3°.

17. The binocular of claim 15, wherein said offset value lies in a range of 4 to 9 mm.

18. A binocular for viewing an object, the binocular comprising:

first and second tubes conjointly defining a distance therebetween;

first and second Abbe-König prism systems arranged in said first and second tubes, respectively, for image inverting a visual viewing beam in the tube corresponding thereto;

each of said Abbe-König prism systems including an isosceles prism and a roof prism disposed one behind the other;

each of said tubes having a forward lens forward of the Abbe-König prism system and a rearward lens rearward of the Abbe-König prism system;

said forward and rearward lenses of each of said tubes defining an optical axis passing through the corresponding Abbe-König prism system disposed therebetween;

each one of said Abbe-König prism systems being configured to offset the corresponding optical axis passing therethrough in a range from a zero offset to a predetermined offset value;

a laser transmitter defining a laser beam outgoing therefrom to said object and being disposed in said first tube;

a laser receiver being disposed in said second tube;

said laser receiver being assigned to said laser transmitter with said laser beam being reflected at said object to become an incoming laser beam to said laser receiver;

a folding bridge connecting said first and second tubes so as to permit varying said distance between said first and second tubes and therewith varying a spacing between said laser transmitter and said laser receiver parallel to each other;

said roof prism of each of said Abbe-König prism systems defining a splitter arrangement for splitting the visual viewing beam and the laser beam, which run part way in common in the corresponding tube, into separate beams;

said isosceles prism and said roof prism conjointly defining a gap therebetween;

each one of said roof prisms comprising two prism parts conjointly defining an interface therebetween whereat said two prism parts are cemented to each other; and, said splitter arrangement being disposed at said interface.

19. The binocular of claim 18, wherein said laser beam and said optical axis conjointly define an angle of equal to or less than 0.3°.

20. The binocular of claim 18, wherein said offset value lies in a range of 4 to 9 mm.

* * * * *